US012094333B2

(12) United States Patent
Cox

(10) Patent No.: US 12,094,333 B2
(45) Date of Patent: Sep. 17, 2024

(54) SHORT RANGE INTERVEHICLE COMMUNICATION ASSEMBLY

(71) Applicant: Robert Cox, Gilmer, TX (US)

(72) Inventor: Robert Cox, Gilmer, TX (US)

( * ) Notice: Subject to any disclaimer, the term of this patent is extended or adjusted under 35 U.S.C. 154(b) by 51 days.

(21) Appl. No.: 18/110,455

(22) Filed: Feb. 16, 2023

(65) Prior Publication Data

US 2024/0282193 A1 Aug. 22, 2024

(51) Int. Cl.
*G08G 1/017* (2006.01)
*G06Q 50/26* (2024.01)

(52) U.S. Cl.
CPC ............. *G08G 1/017* (2013.01); *G06Q 50/26* (2013.01)

(58) Field of Classification Search
None
See application file for complete search history.

(56) References Cited

U.S. PATENT DOCUMENTS

| | | | | |
|---|---|---|---|---|
| 6,947,071 B2 | 9/2005 | Eichmann | | |
| 7,026,957 B2 | 4/2006 | Rubenstein | | |
| 7,623,949 B2 * | 11/2009 | Nou | G07C 5/008 | 701/2 |
| 8,401,477 B2 * | 3/2013 | Lofton | G08G 1/096791 | 455/73 |
| 8,633,836 B1 * | 1/2014 | Ball | G08G 1/14 | 340/988 |
| 8,818,626 B2 * | 8/2014 | Bowden | B60R 1/29 | 348/148 |
| 8,939,839 B2 * | 1/2015 | Cash | A63F 13/428 | 463/40 |
| D747,386 S * | 1/2016 | Li | D16/208 | |
| 9,315,152 B1 * | 4/2016 | Maestas | G01S 19/13 | |
| 10,387,967 B1 * | 8/2019 | Hayward | B60R 25/20 | |
| 10,438,421 B2 * | 10/2019 | Bashani | G07B 15/02 | |
| 10,645,552 B2 * | 5/2020 | Lofton | H04M 1/6091 | |
| 10,832,699 B1 * | 11/2020 | McFarland, Jr. | G06F 16/487 | |
| 11,161,475 B2 * | 11/2021 | Abiakle Kai | B60W 50/12 | |
| 11,323,860 B2 * | 5/2022 | Lofton | H04W 4/46 | |
| 2003/0200227 A1 | 10/2003 | Ressler | | |
| 2008/0055050 A1 * | 3/2008 | Brown | H04L 67/12 | 340/10.41 |

(Continued)

FOREIGN PATENT DOCUMENTS

WO WO2010132322 11/2010

*Primary Examiner* — Fekadeselassie Girma

(57) ABSTRACT

A shortrange intervehicle communication assembly for reducing risk of a traffic stop resulting in an adverse outcome includes an activation card and first and second communication devices. The activation card is equipped to store encrypted data. The first communication device is mountable within a first vehicle and is equipped for shortrange communication and to store scans of one or more of a driver's license, an insurance card, a vehicle registration, and a proof of insurance. The first communication device is actuatable by the activation card, positioning the first communication device to transmit the scans and a confirmation of receipt of a citation issued by a law enforcement officer. The second communication device is positioned in a second vehicle occupied by the law enforcement officer. The second communication device is equipped for shortrange audiovisual communication, to convert audio to text, to store the text, and to transmit the citation.

10 Claims, 4 Drawing Sheets

(56) References Cited

U.S. PATENT DOCUMENTS

| | | | | |
|---|---|---|---|---|
| 2014/0162598 | A1* | 6/2014 | Villa-Real | G07F 7/0886 455/411 |
| 2017/0086234 | A1* | 3/2017 | Li | H04W 76/14 |
| 2018/0357073 | A1* | 12/2018 | Johnson | H04M 1/72403 |
| 2019/0051142 | A1* | 2/2019 | Wiles | H04W 4/06 |
| 2019/0132548 | A1* | 5/2019 | Duale | H04L 65/611 |
| 2020/0234515 | A1* | 7/2020 | Gronsbell | H04Q 9/00 |
| 2024/0081591 | A1* | 3/2024 | Genn | A47L 9/0488 |
| 2024/0086487 | A1* | 3/2024 | Cox | G06F 16/9558 |

* cited by examiner (Box Diagram)

SHORT RANGE INTERVEHICLE COMMUNICATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to communication assemblies and more particularly pertains to a new communication assembly for reducing risk of a traffic stop resulting in an adverse outcome. The present invention discloses a communication assembly that allows a driver, upon being stopped for an infraction by a law enforcement officer, to communicate with the law enforcement officer without either party having to leave their vehicle.

(2) Description of Related Art Including Information Disclosed Under 37 CFR 1.97 and 1.98

The prior art relates to communication assemblies, which may comprise driver to driver communication systems relying on networks or radio wave communication, and networked systems that supply information on vehicles and drivers upon actuation of tags on vehicles. Related prior art comprises video monitoring systems for vehicles, which may comprise speakers. What is lacking in the prior art is a communication assembly comprising an activation card and first and second communication devices, wherein the first communication device can store scans of one or more of a driver's license, an insurance card, a vehicle registration, and a proof of insurance, which are selectively transmitted to the second communication device, which is in possession of a law enforcement officer.

BRIEF SUMMARY OF THE INVENTION

An embodiment of the disclosure meets the needs presented above by generally comprising an activation card, a first communication device, and a second communication device. The activation card is equipped to store encrypted data. The first communication device is configured to be mountable within a first vehicle and is equipped for short-range communication and to store scans of one or more of a driver's license, an insurance card, a vehicle registration, and a proof of insurance. The first communication device is selectively actuatable by the activation card, positioning the first communication device to selectively transmit the scans and a confirmation of receipt of a citation issued by a law enforcement officer. The second communication device is positioned in a second vehicle occupied by the law enforcement officer. The second communication device is equipped for shortrange audiovisual communication, to convert audio to text, to store the text, and to transmit the citation.

Another embodiment of the disclosure includes a system wherein the first communication device is mounted within the first vehicle and the second communication device is positioned in the second vehicle occupied by the law enforcement officer.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
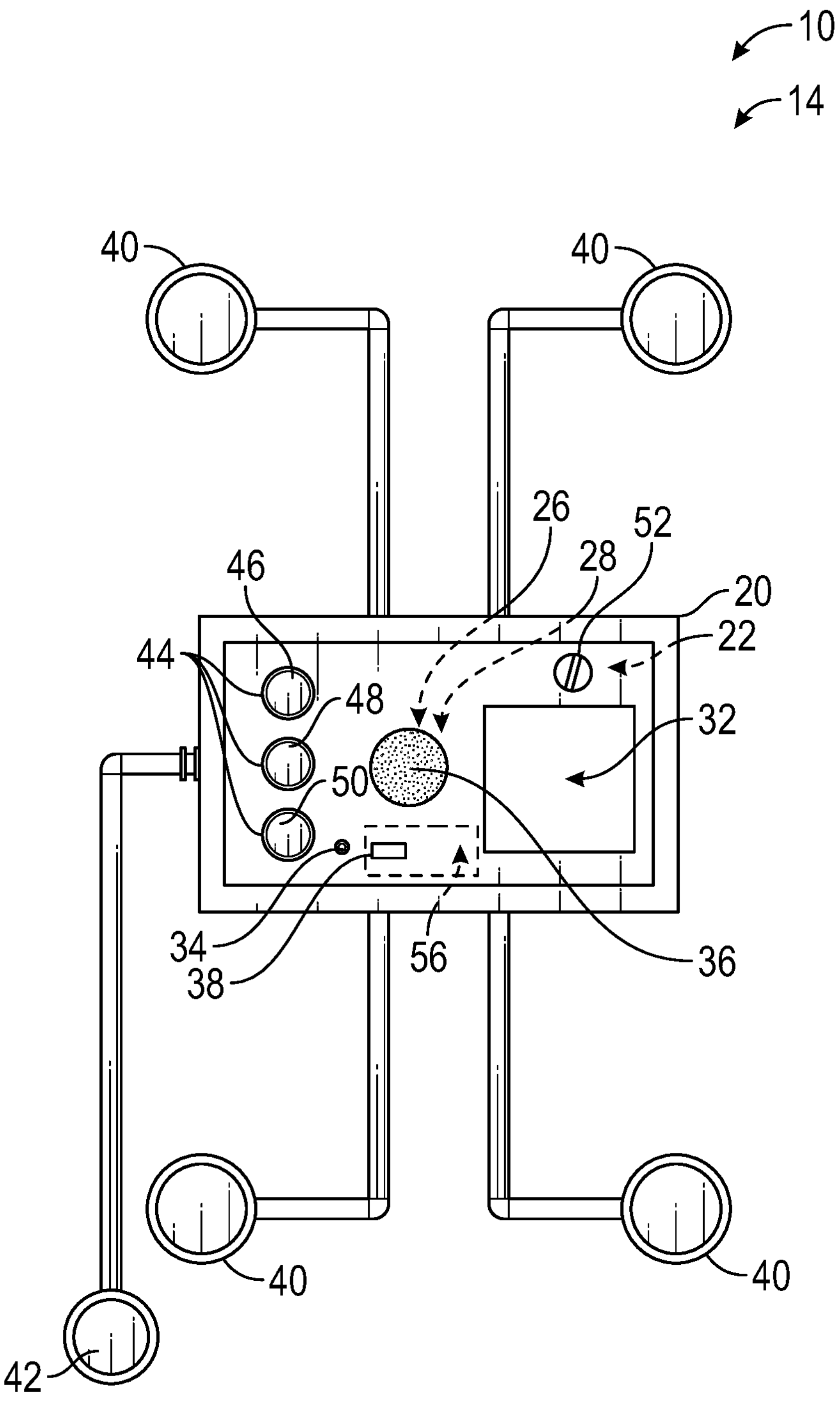
FIG. 1 is a front view of a shortrange intervehicle communication assembly according to an embodiment of the disclosure.
Figure 2:
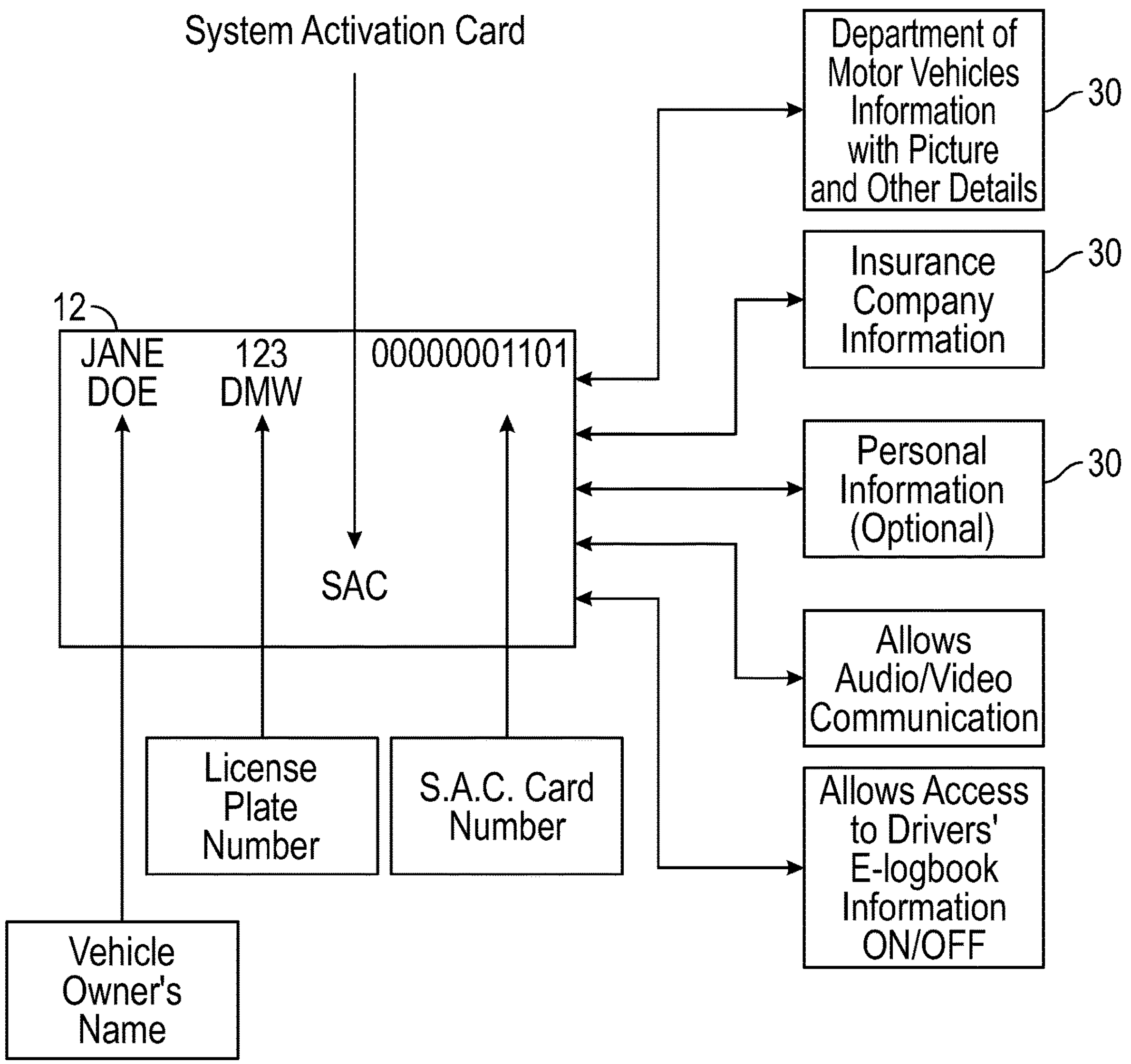
FIG. 2 is a box diagram of an embodiment of the disclosure.
Figure 3:
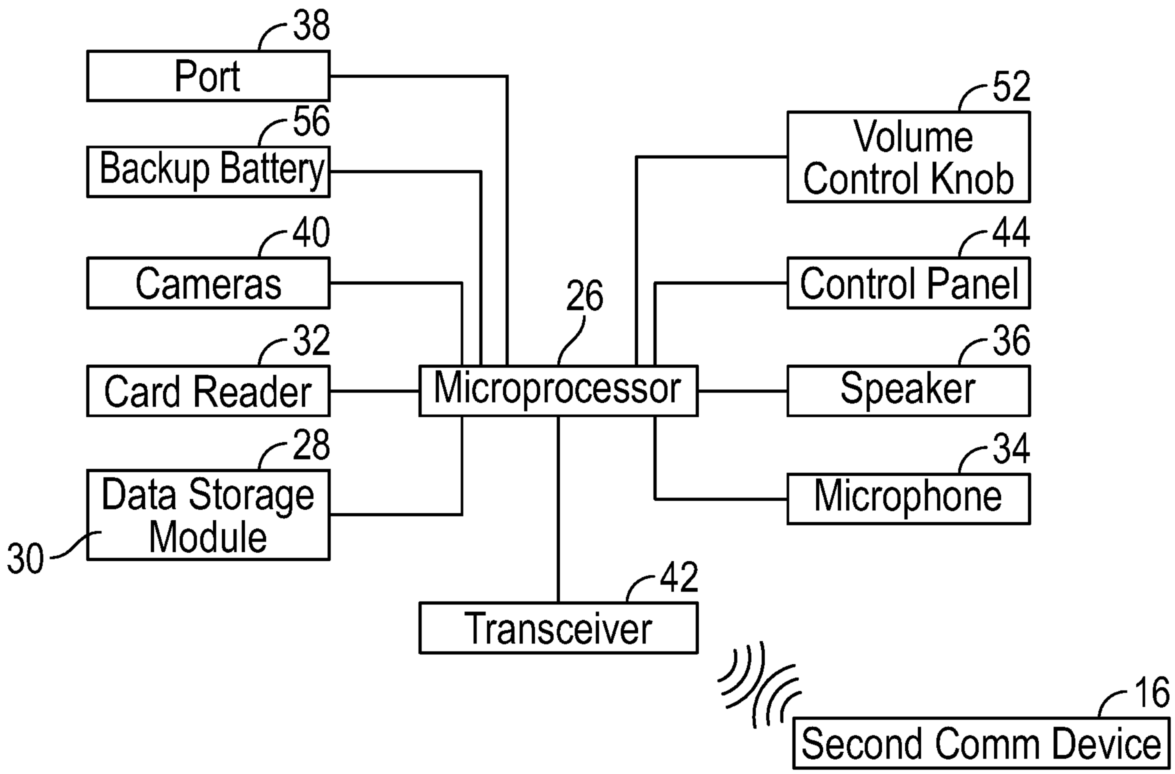
FIG. 3 is a block diagram of an embodiment of the disclosure.
Figure 4:
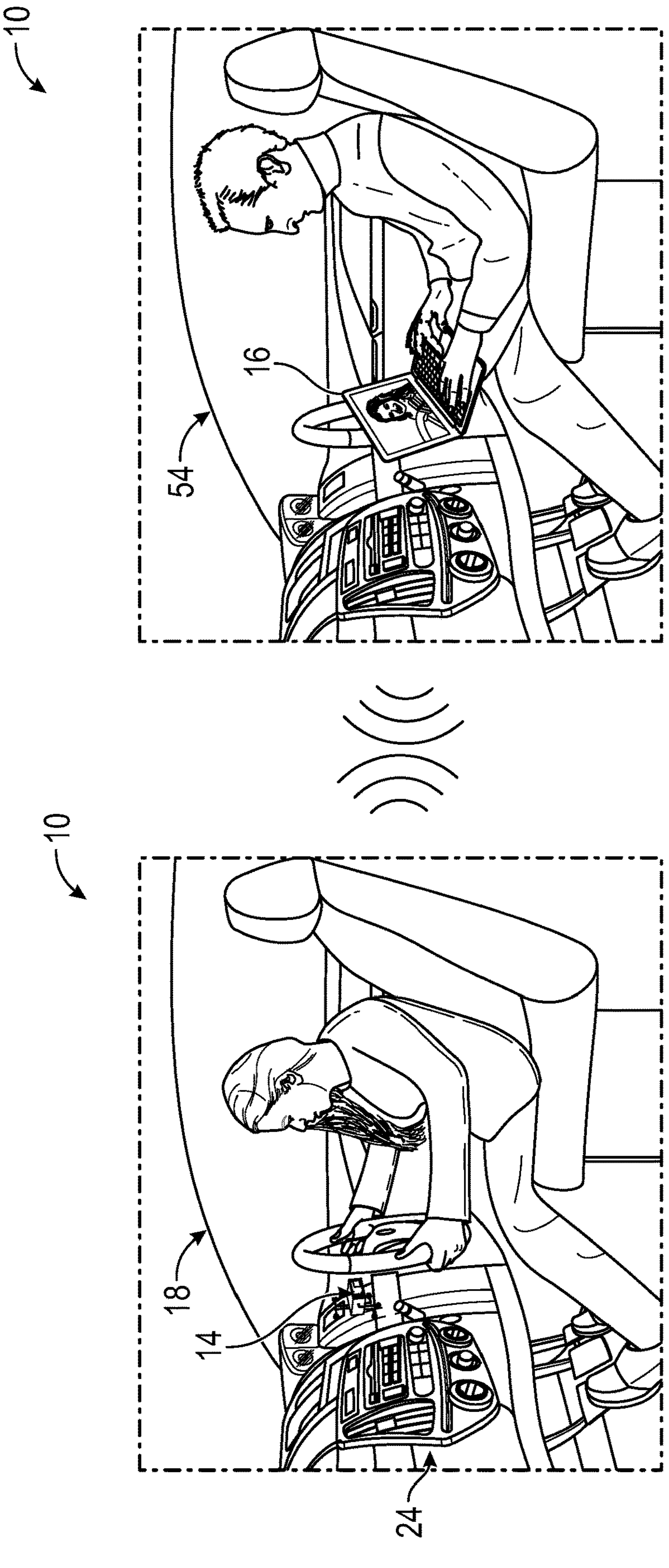
FIG. 4 is an in-use view of an embodiment of the disclosure.

With reference now to the drawings, and in particular to FIGS. 1 through 4 thereof, a new communication assembly embodying the principles and concepts of an embodiment of the disclosure and generally designated by the reference numeral 10 will be described.

As best illustrated in FIGS. 1 through 4, the shortrange intervehicle communication assembly 10 generally comprises an activation card 12, a first communication device 14, and a second communication device 16. The activation card 12 is equipped to store encrypted data and may comprise a driver's license or a state issued identification card.

The first communication device 14 is configured to be mountable within a first vehicle 18 and is equipped for shortrange communication and to store scans 30 of one or more of a driver's license, an insurance card, a vehicle registration, and a proof of insurance. The first communication device 14 is selectively actuatable by the activation card 12, positioning the first communication device 14 to selectively transmit the scans 30 and a confirmation of receipt of a citation issued by a law enforcement officer.

The first communication device 14 comprises a housing 20, which defines an interior space 22 and which is configured to be mountable to a dash 24 of the first vehicle 18. A microprocessor 26 and a data storage module 28 are attached to the housing 20 and are positioned in the interior space 22, with the data storage module 28 being operationally engaged to the microprocessor 26. A card reader 32, a microphone 34, and a speaker 36 are attached to the housing 20 and are operationally engaged to the microprocessor 26.

The card reader 32 is equipped to read the activation card 12 and to actuate the first communication device 14. The present invention anticipates the activation card 12 being insertable into the card reader 32, readable via radio-frequency identification protocols, or readable by near-field communication protocols.

The data storage module 28 is configured to store the scans 30 of the driver's license, the insurance card, the vehicle registration, the proof of insurance. The data storage module 28 also is configured to store encrypted data from the driver's license, personal information, and an electronic logbook. The present invention anticipates a port 38 (not shown) for connection to an electronic device of the user, allowing the user to transfer files, such as the scans 30, to the data storage module 28.

The microphone 34 is configured to capture audio proximate to the housing 20, while the speaker 36 is configured to broadcast an audio signal. The present invention anticipates a volume control knob 52, which would allow for adjustment of a volume of the speaker 36. The present invention also anticipates the shortrange intervehicle communication assembly 10 utilizing a speaker integral to the first vehicle 18.

A set of cameras 40 is operationally engaged to the microprocessor 26, with each camera 40 being configured to capture an image of a respective area of a passenger compartment of the first vehicle 18. For example, the set of cameras 40 may comprise four cameras 40 focusing on a driver's seat, a passenger seat, a driver's side rear seat, and a passenger side rear seat of the first vehicle 18. The present invention anticipates the set of cameras 40 being wiredly or wirelessly engaged to the microprocessor 26.

A transceiver 42 is operationally engaged to the microprocessor 26. The microprocessor 26 is enabled to selectively actuate the transceiver 42 to transmit the audio captured by the microphone 34, the image, the scans 30 of the driver's license, the insurance card, the vehicle registration, and the proof of insurance, the encrypted data from the driver's license, the personal information, and the electronic logbook. The present invention anticipates the transceiver 42 being wiredly or wirelessly engaged to the microprocessor 26.

A control panel 44 is attached to the housing 20 and is operationally engaged to the microprocessor 26. The control panel 44 is configured to be manipulated to selectively power on the first communication device 14 and to confirm receipt of the citation issued by the law enforcement officer. The control panel 44 may comprise a primary power switch 46, an auxiliary power switch 48, and a confirm button 50, or other controlling elements, such as touch panels, toggles, and the like.

The present invention also anticipates a backup battery 56 which would allow the first communication device 14 to function in event of the first vehicle 18 is disabled or a primary battery of the first vehicle 18 is depleted. The backup battery 56 could be rechargeable by means of a solar panel (not shown).

The second communication device 16 is positioned in a second vehicle 54 occupied by the law enforcement officer. The second communication device 16 is equipped for shortrange audiovisual communication, to convert audio to text, to store the text, and to transmit the citation. The second communication device 16 may comprise a laptop computer, as shown in FIG. 5, a tablet computer, or a computer integral to the second vehicle 54. The present invention is anticipated to be useful to the law enforcement officer as it eliminates direct interaction, thereby enhancing safety for both the law enforcement officer and the user.

In use, if the user in the first vehicle 18 is pulled over by the law enforcement officer in the second vehicle 54, the user simply inserts their driver's license into the scanner to actuate the first communication device 14. The first communication device 14 pairs with the second communication device 16 and transmits the scans 30 of the driver's license, the insurance card, the vehicle registration, the proof of insurance, the encrypted data from the driver's license, and, if relevant, the electronic logbook. If enabled by the user, the first communication device 14 also transmits the personal information. The user and the law enforcement officer and see and speak to each other to discuss a purported infraction, without being required to be in close physical proximity. Should the law enforcement officer elect to issue a citation or warning, it is transmitted to the first communication device 14 and the user confirms receipt by depressing the confirm button 50.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A shortrange intervehicle communication assembly comprising:

an activation card equipped for storing encrypted data;

a first communication device configured to be mountable within a first vehicle, the first communication device being equipped for shortrange communication and for storing scans of one or more of a driver's license, an insurance card, a vehicle registration, and a proof of insurance, the first communication device being selectively actuatable by the activation card, positioning the first communication device for selectively transmitting the scans and a confirmation of receipt of a citation issued by a law enforcement officer; and a second communication device positioned in a second vehicle occupied by the law enforcement officer, the second communication device being equipped for shortrange audiovisual communication, for converting audio to text, for storing of text, and for transmitting the citation.

2. The shortrange intervehicle communication assembly of claim 1, wherein the activation card comprises a driver's license or a state issued identification card.

3. The shortrange intervehicle communication assembly of claim 1, wherein the first communication device comprises:

a housing defining an interior space and configured to be mountable to a dash of the first vehicle;

a microprocessor attached to the housing and positioned in the interior space;

a card reader attached to the housing and operationally engaged to the microprocessor, the card reader being equipped for reading the activation card for actuating the first communication device;

a data storage module attached to the housing, positioned in the interior space, and operationally engaged to the microprocessor, wherein the data storage module is configured for storing the scans of the driver's license, the insurance card, the vehicle registration, the proof of insurance, encrypted data from the driver's license, personal information, and an electronic logbook;

a microphone attached to the housing and operationally engaged to the microprocessor, wherein the microphone is configured for capturing audio proximate to the housing;

a speaker attached to the housing and operationally engaged to the microprocessor, wherein the speaker is configured for broadcasting an audio signal;

a set of cameras operationally engaged to the microprocessor, wherein each camera is configured for capturing an image of a respective area of a passenger compartment of the first vehicle; and a transceiver operationally engaged to the microprocessor, such that the microprocessor is enabled for selectively actuating the transceiver for transmitting the audio captured by the microphone, the image, the scans of the driver's license, the insurance card, the vehicle registration, and the proof of insurance, the encrypted data from the driver's license, the personal information, and the electronic logbook.

4. The shortrange intervehicle communication assembly of claim 3, further including a control panel attached to the housing and operationally engaged to the microprocessor, wherein the control panel is configured for being manipulated for selectively powering on the first communication device and for confirming receipt of the citation issued by the law enforcement officer.

5. The shortrange intervehicle communication assembly of claim 4, wherein the control panel comprising a primary power switch, an auxiliary power switch, and a confirm button.

6. The shortrange intervehicle communication assembly of claim 3, further including a volume control knob attached to the housing and operationally engaged to the microprocessor, wherein the volume control knob is configured for rotation for selecting a volume of the speaker.

7. The shortrange intervehicle communication assembly of claim 1, wherein the second communication device comprising a laptop computer, a tablet computer, or a computer integral to the second vehicle.

8. The shortrange intervehicle communication assembly of claim 3, further including a port attached to the housing and operationally engaged to the microprocessor, wherein the port is configured for insertion of a plug of a cable attached to an electronic device of a user for transferring the scans to the data storage module.

9. A shortrange intervehicle communication system comprising:

a first vehicle;

a second vehicle occupied by a law enforcement officer;

an activation card equipped for storing encrypted data;

a first communication device attached to and positioned in the first vehicle, the first communication device being equipped for shortrange communication;

scans stored on the first communication device of one or more of a driver's license, an insurance card, a vehicle registration, and a proof of insurance;

a second communication device positioned in the second vehicle, the second communication device being equipped for shortrange audiovisual communication, for converting audio to text, for storing of text, and for transmitting a citation; and wherein the first communication device is selectively actuatable by the activation card, positioning the first communication device for selectively transmitting the scans and a confirmation of receipt of the citation issued by the law enforcement officer.

10. A shortrange intervehicle communication assembly comprising:

an activation card equipped for storing encrypted data, the activation card comprising a driver's license or a state issued identification card;

a first communication device configured to be mountable within a first vehicle, the first communication device being equipped for shortrange communication and for storing scans of one or more of a driver's license, an insurance card, a vehicle registration, and a proof of insurance, the first communication device being selectively actuatable by the activation card, positioning the first communication device for selectively transmitting the scans and a confirmation of receipt of a citation issued by a law enforcement officer, the first communication device comprising:

a housing defining an interior space and configured to be mountable to a dash of the first vehicle, a microprocessor attached to the housing and positioned in the interior space, a card reader attached to the housing and operationally engaged to the microprocessor, the card reader being equipped for reading the activation card for actuating the first communication device, a data storage module attached to the housing, positioned in the interior space, and operationally engaged to the microprocessor, wherein the data storage module is configured for storing the scans of the driver's license, the insurance card, the vehicle registration, the proof of insurance, encrypted data from the driver's license, personal information, and an electronic logbook, a port attached to the housing and operationally engaged to the microprocessor, wherein the port is configured for insertion of a plug of a cable attached to an electronic device of a user for transferring the scans to the data storage module, a microphone attached to the housing and operationally engaged to the microprocessor, wherein the microphone is configured for capturing audio proximate to the housing, a speaker attached to the housing and operationally engaged to the microprocessor, wherein the speaker is configured for broadcasting an audio signal, a volume control knob attached to the housing and operationally engaged to the microprocessor, wherein the volume control knob is configured for rotation for selecting a volume of the speaker, a set of cameras operationally engaged to the microprocessor, wherein each camera is configured for capturing an image of a respective area of a passenger compartment of the first vehicle, a transceiver operationally engaged to the microprocessor, such that the microprocessor is enabled for selectively actuating the transceiver for transmitting the audio captured by the microphone, the image, the scans of the driver's license, the insurance card, the vehicle registration, and the proof of insurance, the encrypted data from the driver's license, the personal information, and the electronic logbook, and a control panel attached to the housing and operationally engaged to the microprocessor, wherein the control panel is configured for being manipulated for selectively powering on the first communication device and for confirming receipt of the citation issued by the law enforcement officer, the control panel comprising a primary power switch, an auxiliary power switch, and a confirm button; and a second communication device positioned in a second vehicle occupied by the law enforcement officer, the second communication device being equipped for shortrange audiovisual communication, for converting audio to text, for storing of text, and for transmitting the citation, the second communication device comprising a laptop computer, a tablet computer, or a computer integral to the second vehicle.

* * * * *